Figure 1:
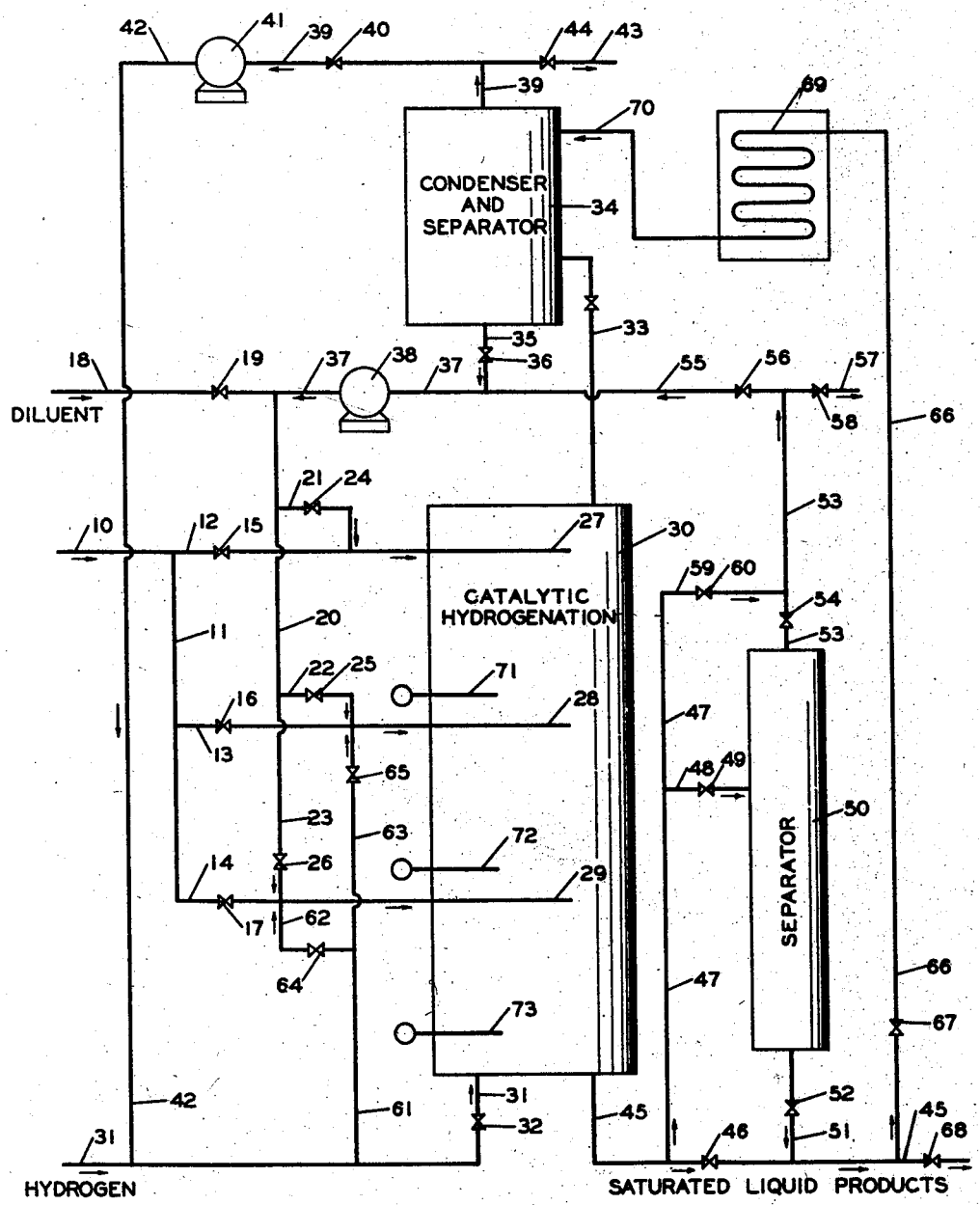

Patented Oct. 26, 1943

2,332,572

UNITED STATES PATENT OFFICE 2,332,572

PROCESS OF CATALYTIC HYDROGENATION

Harold J. Hepp and Jean P. Jones, Bartlesville, Okla., assignors to Phillips Petroleum Company, a corporation of Delaware Application April 2, 1940, Serial No. 327,518

11 Claims. (Cl. 260—676)

This invention relates to catalytic hydrogenation and particularly to the catalytic non-destructive hydrogenation of unsaturated organic compounds.

Because of the nature of the hydrogenation reaction, much heat is liberated when unsaturated organic compounds are hydrogenated. For example, when olefin hydrocarbons having the boiling range of motor fuel are hydrogenated, the amount of heat liberated is of the order of 30,000 calories per gram-mole. This is enough heat to raise the temperature of a stream of vaporous diisobutylene, for example, from 400° F. to 1010° F. When the hydrogenation is effected with the aid of a catalyst, control of the temperature of the catalyst is highly important. If the temperature is not controlled properly, portions of the catalyst become overheated or underheated; this results in undesired products from side reactions such as destructive hydrogenation, in a decreased yield, and often in an increased rate of deactivation and/or deterioration of the catalyst. Overheating of the catalyst is especially detrimental, as it may destroy part or all of the catalytic activity.

Overheating of the catalyst, for example, may occur because of the development of localized hot spot or zone in which an overly large fraction of the hydrogenation takes place. The production of such a hot zone is favored when the concentration of the reacting ingredients is high, at moderate to high superatmospheric pressure, for the reaction occurs at a rate that is determined largely by the concentration of the reactants. The heat liberated by the hydrogenation causes such a cumulative increase in the temperature that the catalyst becomes overheated. As an overly large fraction of the hydrogenation takes place in the hot zone, other parts of the catalyst do not effect their proper share of the hydrogenation. In other words, the part of the catalyst within the hot zone carries more than its share of the load and the parts outside of the hot zone carry less than their share.

This condition is especially undesirable because the hot zone does not remain in one place; in consequence of the destruction of the catalyst, it moves in the direction of the flow of the reactants. The result is that the destruction of the catalyst is not limited to a small zone or amount but progresses throughout the entire body of catalyst, and eventually affects it all. Serious losses of catalyst, reductions in yields, production of impurities and other disadvantages result from such uncontrolled mode of operation.

In the past, control of the temperature in exothermic catalytic conversion processes has been effected usually by means of a fluid medium in heat-exchange relationship with the catalyst. To be successful, this scheme requires that the heat exchange be highly efficient. The reaction therefore is effected generally in a multiplicity of relatively small and/or narrow catalyst chambers arranged in heat-exchange relationship with the temperature-controlling medium. Such catalyst chambers are made usually of tubes having a diameter of the order of 0.5 to 1.5 inches, or of concentric tubes that form annular zones having a thickness of the same order of magnitude. Heat is removed by the temperature-controlling medium, which is in contact with the walls of the catalyst chambers. Equivalent systems in which temperature-controlling means are placed in contact with the catalyst, such as tubular members positioned within the catalyst body and containing a liquid of suitable boiling point or some other temperature-controlling fluid medium, have also been proposed.

Such previously proposed catalytic conversion systems have a number of outstanding disadvantages, among which may be mentioned: the high cost of manufacture of the many catalyst chambers required; the high cost of certain heat-exchange media such as mercury, diphenyl, and the like; the difficulty of making and maintaining fluid-tight connections or joints; the comparative inconvenience of replacement of catalyst; and the difficulty of preventing leakage of the temperature-controlling medium, which may be toxic as well as expensive. In spite of these disadvantages, such systems have been used because many catalytic conversions must be effected within narrow temperature limits. If an efficient heat-exchange relationship is not maintained, the catalyst may become too hot; this may result in the production of impurities in the product by destructive hydrogenation and/or other undesired reactions and may have a deleterious effect upon the activity of the catalyst. The necessity of an efficient heat-exchange relationship between the catalyst and the temperature-controlling medium precludes the use of a comparatively large body of catalyst in an individual catalyst chamber.

It is an object of this invention to provide an improved process for effecting the catalytic, non-destructive, liquid-phase hydrogenation of organic compounds.

Another object of this invention is to effect a controlled liquid-phase, non-destructive hydrogenation of unsaturated hydrocarbons having boiling points in or near the motor fuel boiling range.

It is a further object of this invention to provide an improved process for effecting liquid-phase hydrogenation of organic compounds such as gasoline-range olefin hydrocarbons without the use of a multiplicity of relatively small tubular or narrow annular (or equivalent) catalyst chambers in heat-exchange relationship with a temperature-controlling medium.

Other objects and advantages of the invention will be apparent to those skilled in the art from the following description, the accompanying drawings, and the appended claims.

We have found that liquid-phase hydrogenation of organic compounds, such as unsaturated hydrocarbons in the gasoline boiling range, may be effected in an efficacious, economical, and advantageous manner by carrying out the hydrogenation in the presence of an inert diluent having a boiling point appreciably lower than that of the compound being hydrogenated. Diluents suitable for use in our process are any materials that are inert under the conditions prevailing in the catalytic hydrogenation chamber, and that have boiling points or ranges appreciably lower than that of the material being hydrogenated by a difference of from about 50 to 300° F., preferably a difference between about 75 and 150° F. In any case such a low-boiling diluent must be miscible in all proportions with the material to be hydrogenated at the temperatures of hydrogenation, and it must be capable of existing in appreciable proportion in the vapor phase at or just above the lowest temperature at which hydrogenation is to be effected. A low-boiling diluent with a narrow boiling range is often most desirable and for this reason the use of essentially pure compounds is generally preferable. However, mixtures of two or more compounds having boiling points close together, the mixture having a narrow boiling range, such as a range of not more than about 75° F., are often more readily available, and are quite readily used provided that the highest temperature of the boiling range is at least about 50° F. below the lowest boiling point of the material being hydrogenated, all such boiling points being measured at atmospheric pressure. In many cases a mixture having such an appreciably extended boiling range is more desirable as a low-boiling diluent than a pure compound, as this will tend to insure the presence of material being vaporized, and absorbing heat of reaction, throughout a greater length of the catalyst chamber. The use of a low-boiling diluent with such a boiling range is one of the features of our invention.

The hydrogenation is carried out in an essentially vertical catalyst chamber containing a body, or bodies, of solid hydrogenation catalyst and with the material undergoing hydrogenation and the saturated products produced being substantially in the liquid-phase, throughout the course of the hydrogenation. A liquid comprising the unsaturated organic material and an inert diluent having a substantially lower boiling range, is introduced to the top portion of the catalyst bed, and hydrogen, preferably in excess of the amount stoichiometrically required, is introduced at the bottom portion of the catalyst bed. The body of catalyst is so arranged, and has such a physical composition, that counter-current flow of liquid and gaseous phases is possible with intimate contact between the two and without appreciable channeling. Saturated organic material, substantially in the liquid phase, is recovered from the bottom of the catalyst bed, and vapors containing excess hydrogen and the low-boiling diluent in the vapor state, are recovered from the top of the catalyst bed.

The process may be operated with practically any known hydrogenation catalyst that is suitable for the non-destructive hydrogenation of the unsaturated organic material charged to the process. It is important, however, when a bed of catalyst is used, that the body of catalyst be comprised of large particles, with few if any small particles being incorporated therewith. It may, at times, be possible or desirable to have the catalyst in one large body resting upon a support, such as a perforated false bottom, placed near the bottom of the catalyst space, especially if this body of catalyst is made up of large pieces of solid material. However, it will generally be more desirable to have the catalyst body consist of a number of smaller bodies resting on supports so that, between each of the smaller bodies of catalyst there is ample space for a separation between liquid material flowing downwardly and material flowing upwardly in the vapor state. At times it may be desirable and expedient to form the catalyst particles in special shapes, such as a shape similar to a Raschig ring or the like, or the shape of other materials used in the packing of fractionating and/or absorption equipment and known to those skilled in the art. Such special treatment will, at times, give better contact between gaseous hydrogen and unsaturated liquid as well as aiding in the counter-current flow of gases and liquids. If it should be possible or desirable to incorporate a mobile catalyst in the liquid comprising unsaturated organic material and diluent, such as a liquid catalyst, or one soluble in or suspended in the liquid, ordinary bubble-trays or other conventional packing made of inert material may be used, with the catalyst-containing liquid flowing downwardly in a manner similar to that of an absorption oil, and being discharged from the chamber at the bottom, with hydrogen-containing vapors flowing in counter-current, direct contact. In any case, by catalytic hydrogenation chamber will be understood that portion of the chamber wherein a catalytic hydrogenation takes place.

The temperature at the top of the catalyst bed should be a reaction temperature, so that some reaction will take place between unsaturated material and hydrogen. The temperature will tend to be higher in lower parts of the catalyst chamber, with the highest temperature at or quite close to the bottom of the chamber. However, due to the evaporation of the low-boiling inert diluent, the difference in temperature will not be extreme. When our process is operated for the catalytic hydrogenation of olefins in the motor fuel boiling range, temperatures at the top will generally not be less than about 75 to 100° F. and should not be greater than about 400° F., and will preferably be between 250 and 350° F.

The amount of low-boiling diluent will be somewhat dependent upon the charge stock, especially the concentration of unsaturated material in the total liquid introduced to the top of the hydrogenation chamber; upon the reaction temperature as it relates to the boiling ranges of the material being hydrogenated, the low-boiling diluent, and the differential between the boiling ranges of this diluent and the heavier material; and upon the relative hydrogen partial pressure. The total liquid material charged to the top portion of the hydrogenation chamber should not contain more than about 50 mol per cent of unsaturated material, and preferably between about 20 and 40 mol per cent. Especially should the concentration of unsaturated material be low if this material is highly unsaturated, as when an aromatic compound such as benzene or toluene is to be hydrogenated to a naphthene such as cyclohexane or methyl cyclohexane, etc. Some of the remainder of this liquid material may be saturated material which has essentially the same boiling range as the unsaturated material to be hydrogenated, such as will be present when a part of the saturated product is recycled. This saturated material will, in effect, be an inert diluent, but it is to be distinguished from the low-boiling, inert diluent charged to the process in accordance with our present disclosure.

The highest temperature of hydrogenation must, of course, be appreciably below the critical temperature of the material being hydrogenated, and the reaction temperature near the top of the hydrogenation chamber must be well below the critical temperature of the total mixture charged to the process at this point. However, it is not essentially necessary that the critical temperature of the low-boiling diluent be above the reaction temperature at the top of the hydrogenation chamber, as this diluent can be in solution in the liquid material to be hydrogenated under such conditions, and even somewhat above its own critical temperature this diluent will have a substantial heat of vaporization when it vaporizes from such solution. With a low hydrogenation temperature at the top of the hydrogenation chamber, such as 150 to 250° F., the difference in the normal boiling range of the liquid being hydrogenated and of the low-boiling diluent may be somewhat greater than if this hydrogenation temperature is somewhat higher, such as in the region of about 350° F., and the choice of the low-boiling diluent should be made with this in mind. Although such a diluent will remain in solution above its critical temperature, its vapor pressure in this region will be quite high, and relatively more of the diluent must be used in order to insure that a sufficient quantity is present in solution. This is best done at the higher hydrogenating temperatures by employing a diluent which has as high a boiling point, or range, as possible while still having it sufficiently below the boiling range of the heavier material as to be vaporized during hydrogenation without undue vaporization of the material being hydrogenated. As the hydrogenation catalyst becomes deactivated, it will generally be necessary to raise the hydrogenation temperature in order to maintain the same amount of hydrogenation. If the process is conducted initially using a low-boiling diluent which has a normal boiling point rather widely separated from the heavier, unsaturated material, it may be desirable, and is a part of our invention, to add a low-boiling diluent whose normal boiling temperature is not so widely separated from the unsaturated material as it becomes necessary to raise the hydrogenation temperature.

With the limits just discussed in mind, the inert, low-boiling diluent should comprise at least about 20 mol per cent of the total liquid mixture entering the top of the hydrogenation chamber, and may be as high as about 80 mol per cent of this liquid. Based on the amount of unsaturated material present, the diluent should be between 1 and 6 times the molar quantity of unsaturated material, preferably about 2 to 4 times this quantity. When hydrogenating a rather pure material such as a mixture of isooctenes, a low-boiling diluent such as butane or pentane, or mixtures thereof, may be used, and although some propane might be used in a mixed diluent, pure propane is too volatile for satisfactory use, although propane could be used with pentenes and hexenes. With a mixture, such as a mixture predominating in heptenes, octenes and nonenes, butane is better as a diluent than pentane, although a mixture of butanes and pentane, especially isopentane, can be used. When the material to be hydrogenated consists of a heavy naphtha, such as one with an initial boiling point of about 300° F., the low-boiling diluent may conveniently be a heptane or volatile octane at a high temperature of hydrogenation, while butane or pentane may be used at lower hydrogenation temperatures and will be somewhat more desirable. For any particular unsaturated material and hydrogenation temperature range, the low-boiling diluent to be used, and the amount of such diluent may be readily determined by trial by one skilled in the art.

Some control of the ease with which the low-boiling diluent may vaporize when in the hydrogenation chamber may at times be effected by controlling the pressure within the chamber. However, in general we contemplate the use of a substantially constant pressure throughout the course of a given cycle of operation, which will be limited by amount of charge stock, catalyst activity or the like. The process is to be operated under an appreciable super-atmospheric pressure of at least 50 pounds per square inch, and may be at times as high as 2000 or 3000 pounds per square inch or more, with a preferable range between about 200 and 1500 pounds per square inch.

Figure 2:
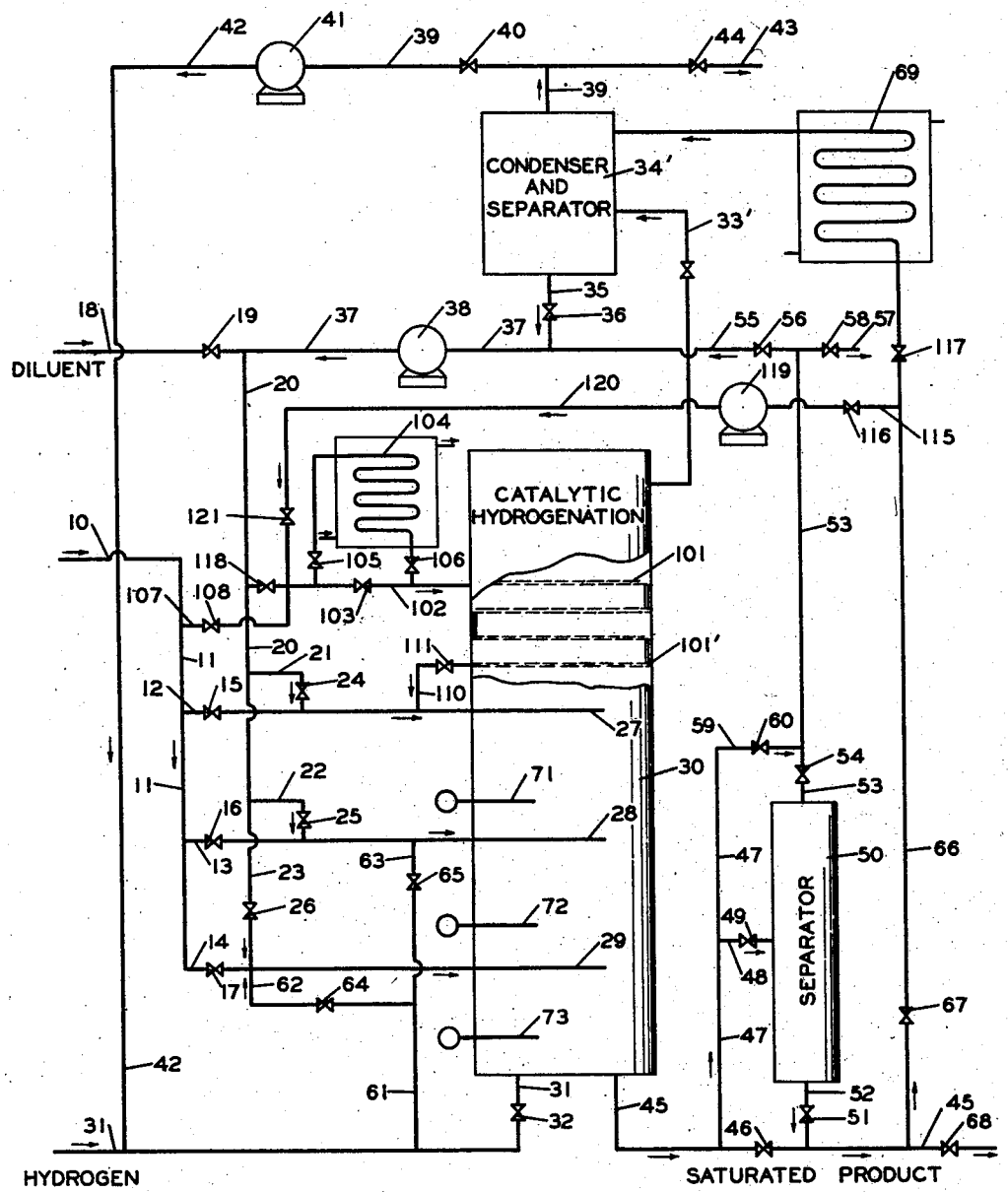

The invention will now be described with reference to the accompanying drawings, in which Figure 1 shows a diagrammatical view of a preferred arrangement of apparatus for practicing our invention and Figure 2 shows a modified arrangement of apparatus. It will be obvious to those skilled in the art that modifications other than the specific arrangements shown may be used without passing beyond the scope of the invention.

The liquid feed stock, containing unsaturated organic compounds, such an olefin hydrocarbons boiling in the motor-fuel range, is charged to the process through pipe 10, which leads to a manifold 11 from which lead pipes such as 12, 13 and 14 having control-valves 15, 16 and 17, respectively. In inert, low-boiling liquid diluent, having a boiling point appreciably lower than the average boiling point of the feed stock, such as butane, is charged to the process through pipe 18, in an amount controlled by the valve 19, and passes to manifold 20. This diluent, augmented by recycled low-boiling diluent from pipe 37, is distributed in any desired manner through the branch-pipes 21, 22 and 23, which are provided with control-valves 24, 25 and 26, respectively, into the branch-pipes 12, 13 and 14 aforementioned. The branch-pipes 12, 13 and 14 convey the feed-stock and/or diluent to distributors 27, 28 and 29 positioned at suitable points in a catalytic hydrogenation chamber 30.

Simultaneously hydrogen is charged to the catalytic hydrogenation chamber 30 through pipe 31 having control-valve 32. In the catalytic hydrogenation chamber 30 the liquid hydrocarbons and the gaseous hydrogen pass counter-currently while in contact with a suitable hydrogenation catalyst, not shown. The unsaturated organic compounds in the feed stock undergo hydrogenation, whereby hydrogen is added to unsaturated carbon-to-carbon bonds, and much heat is liberated. The temperature tends to increase as a result of the heat of hydrogenation, but the inert, low-boiling diluent tends to vaporize from the solution under the prevailing conditions of pressure and of admixture with the feed stock and with already hydrogenated compounds. Thereupon vapors of this diluent join the counter-current stream of hydrogen. In this manner, without an excessive temperature rise, a large amount of the heat of hydrogenation is absorbed as latent heat of vaporization of the low-boiling diluent and is carried away by the vaporized diluent, which passes from the catalytic hydrogenation chamber through pipe 33, provided with a suitable valve, into the condenser and/or separating or fractionating means 34, and the main portion of the material being hydrogenated, and of the saturated product, remains in the liquid phase.

In the separating means 34 the gaseous material passing from the top portion of catalytic hydrogenation chamber 30 through conduit 33 is suitably cooled, by means not completely shown, so that most or all of the hydrocarbons are liquefied and especially substantially all of the heavier hydrocarbons in the motor-fuel boiling range. This liquid material is separated and returned to the process, passing through pipe 35 controlled by valve 36, to conduit 37, pump 38, and continues through conduit 37 to manifold 20. Hydrogen-containing gases pass from the means 34 through pipe 39 and may be returned directly to the process through pipe 39, provided with a valve 40 and a pump 41, and pipe 42, or they may be discharged partly or completely from the process through pipe 43 provided with valve 44. If desired, part or all of the diluent may be allowed to pass uncondensed through the separating means 34 and part or all of such uncondensed diluent may be discharged from the process through pipe 43.

The hydrogenated material leaves the catalytic hydrogenation chamber 30 through pipe 45, essentially in a liquid state. It may be discharged from the process through control-valves 46 and 68 or it may be passed partly or totally through pipe 47 and branch-pipe 48, provided with control-valve 49, into the separator or fractionator 50, which is provided with suitable heating and cooling means, not shown. In the separator 50, any of the low-boiling diluent remaining in the effluent liquid from catalytic hydrogenator 30 may be removed, as by fractional distillation. The liquid product thus freed from the low-boiling diluent is discharged through pipe 51 controlled by valve 52. The diluent thus recovered may be returned to the process through pipe 53 controlled by valve 54, and through pipe 55 controlled by valve 56, passing on to pipe 37, or it may be discharged partly or totally from the process through pipe 57 provided with valve 58. If desired, part of the effluent liquid from catalytic hydrogenation chamber 30 may be recycled to the process directly by being passed from pipe 47 through pipe 59 controlled by valve 60 into pipe 53.

If desired, hydrogen may be added to the material flowing in branch-pipes 13 and 14 through manifold 61 and branch-pipes 62 and 63, which are provided with control-valves 64 and 65, respectively.

The composition of the material passing through the distributors 27, 28 and 29 in the catalytic hydrogenator 30 may be varied in any manner desired by means of control valves 15—17, 24—26, and 64 and 65. For example, in a possible mode of operation, valves 16, 17, 64 and 65 may be closed and liquid diluent alone may be passed through distributors 28 and 29 in amounts controlled by valves 25 and 26 while a mixture of feed stock and diluent is passed through distributor 27 in amounts controlled by valves 15 and 24. Control of the amounts and the composition of the material entering chamber 30 through distributors 27—29 is made in accordance with the requirements for satisfactory controlled hydrogenation as indicated, for example, by the temperature indicated by the thermometers 71, 72 and 73, or as otherwise indicated by trial.

As a modification of our process, a portion of the hydrogenated product may be used as an absorption medium to aid in the separation of low-boiling diluent from the mixture of diluent vapors and hydrogen passing from the top of the hydrogenation chamber 30. In such a modification, a portion of the hydrogenated product passing through conduit 45, either with or without stabilization in the separator 50, is passed through conduit 66 and valve 67, aided by proper control of valve 68 in conduit 45. The material passing through conduit 66 is passed through cooling coil 69 and conduit 70 to the top portion of separating means 34. The mixture of absorption medium and absorbed diluent, in the liquid phase, passes from the separator 34 through conduit 35 and is returned to the system. If necessary, under some conditions a pumping means not shown may be inserted in conduit 66 and/or 70. If more of the hydrogenated product is used for such absorption of the low-boiling diluent than it is desired to return as high-boiling diluent to the process, means not shown may be inserted between separating means 34 and conduit 37 for effecting a separation of absorbed low-boiling diluent from the higher boiling, hydrogenated product.

For simplicity, the number of distributors shown in the drawings has been limited to three; any number, however, may be used in accordance with the requirements of any particular application of our invention. Additional branch-pipes, control-valves, and the like may be incorporated without passing beyond the scope of our invention.

The distributors 27 to 29 are adapted by any known means to provide even distribution of the material flowing through them into the catalytic hydrogenation chamber 30. Each may be constructed in the shape of a rose, as a perforated tube in the form of a loop or circle, or the like. If desired, the zones of the catalytic hydrogenator 30 in which the distributors are positioned may be kept devoid of catalyst, as for example by the use of perforated partitions each supporting a limited portion of the total body of catalyst.

It may at times be more desirable to incorporate all or a part of the separating means 34 as a more integral part of the chamber 30. In such a modification, the chamber will extend well above the top of the catalyst bed, and this extended portion will comprise a series of bubble-trays or the like, as used in ordinary distillation columns.

Such a modification is diagrammatically illustrated in Figure 2, wherein much of the apparatus shown in Figure 1 is again shown, and designated by the same reference numerals. The body of the chamber 30 extends well above the body of the catalyst, not shown, and is indicated in a partial cut-away section showing bubble-trays 101, which are of the conventional type. An additional conduit or pipe 102, controlled by valve 103 leads from manifold 20, and supplies a stream of low-boiling diluent fluid to the top bubble-tray. If desired, this stream may be cooled by passing all or a part of it through cooling coil 104, with valves 105 and 106 being open and valve 103 completely or partially closed. This absorbent liquid flows counter-current to and in intimate contact with, vapors and gases rising from the top of the catalyst bed and acts to remove and entrain with it any heavier material introduced originally through conduit 10, as well as some of the lighter vapors. With such a modification, the hydrocarbon material passed through conduit 102 to top bubble tray may advantageously contain large amounts of heavier saturated material being recycled through the hydrogenation process. This is accomplished by passing such a stream from conduit 66 through conduit 115 controlled by a valve 116, pump or compressor 119, and conduit 120 and valve 121 to conduit 102, valve 117 in conduit 66 being partially or completely closed, and valve 118 in conduit 102 being completely closed if it is desired that this stream should consist entirely of heavier material. The absorption liquid may also consist completely of, or partially comprise, liquid unsaturated material charged to the process for hydrogenation. This may be accomplished by opening valve 108 in conduit 107 which leads from manifold 11 to conduit 102, with valve 118 being closed and valve 121 being partially or completely closed. The bottom bubble-tray 101', may have a down-spout leading directly to the catalyst chamber proper, or the liquid on it may be removed, as shown, through a conduit 110 provided with a valve 111 and leading into the pipe 27, where it mingles with the material in this pipe and passes, with it, to the catalyst chamber. Vapors and gases passing from the top plate will pass through valve-controlled pipe 33' to condenser and/or separator 34'. Otherwise, the operation of the remaining apparatus is substantially as has been previously described.

The hydrogenation catalyst used in catalytic hydrogenator 30 may be any catalyst that is suitable for the hydrogenation of the organic compound in hand. Examples of catalysts of this nature are materials comprising or consisting of nickel, copper, iron, palladium, platinum, cobalt, chromium, manganese, titanium, molybdenum, vanadium and the like, in a finely divided state or in the form of oxides or other compounds, preferably supported on a porous material such as activated alumina, porcelain, kieselguhr, pumice, bauxite, etc., and with or without one or more promotion materials. The catalyst may be present as a single undivided batch, or body of catalyst particles, or it may be separated into portions of more or less equal size as by perforated partitions, trays, baskets or the like. We have found that a nickel-containing catalyst is especially efficient in the saturation of olefin hydrocarbons, in a temperature range between 250 and 550° F.

After the process is in operation, only enough diluent need be added through pipe 18 and valve 19 to compensate for that carried away from the system with the liquid product through pipe 45 and/or that discharged from the system through pipe 43 and/or pipe 57.

We have found our porcess to be particularly advantageous for the hydrogenation of unsaturated hydrocarbons boiling in the gasoline range. As examples of such unsaturated hydrocarbons may be mentioned benzene and toluene and the like, and olefin hydrocarbons such as isomeric pentenes, hexenes, heptenes, octenes, nonenes, decenes, and the like, formed by the catalytic polymerization of olefins having lower molecular weights. For the hydrogenation of such olefin hydrocarbons a suitable diluent is a relatively low-boiling paraffin hydrocarbon, such at butane or pentane. If a higher boiling unsaturated hydrocarbon fraction is to be hydrogenated, such as an isooctene or an isononene fraction, a higher boiling hydrocarbon such as hexane may be used as an inert diluent, always provided that a sufficient temperature interval exists between the boiling range of the unsaturated material and of the inert diluent used. For the hydrogenation of hexenes at high pressures, propane may be used; isobutane and/or normal butane may be used at somewhat lower pressures. Choice of a suitable diluent for any selected conditions of pressure, temperature and material being hydrogenated may be made readily by trial.

By the practice of this invention unsaturated hydrocarbons boiling in the motor fuel range, such as can be prepared by catalytic and/or thermal polymerization or conversion of gaseous olefins, may be hydrogenated catalytically and non-destructively to saturated hydrocarbons suitable for use as motor or motor-fuel blending stock. The hydrogenation is effected in an easy, economical, and advantageous manner; the temperature of large bodies of catalyst is controlled and deleterious effects of excessive temperature avoided by the controlled addition of a diluent having a boiling point suitably lower than that of the material undergoing hydrogenation.

As an example of the operation of one modification of our process, an unsaturated hydrocarbon material comprising a mixture of isoheptenes and isooctenes produced by the catalytic copolymerization of the olefins produced from the thermal dehydrogenation of a butane mixture, containing a large proportion of isobutane, was hydrogenated in the liquid phase in the presence of a nickel-containing catalyst comprising nickel, copper, and alumina intimately associated upon a porous support. The catalyst is prepared by soaking at ordinary temperatures a body of pumice granules, comprising particles between 2 and 4 mesh in size, for about a half-hour in a substantially saturated aqueous solution containing about equal amounts of nickel nitrate and aluminum nitrate and about one-quarter of this amount of copper nitrate. After this soaking treatment the body of pumice, the particles of which are impregnated with these various nitrates, is heated to about 600° F., thereby decomposing the nitrates. The body of material is again soaked in a similar saturated solution, and heated to a high temperature decomposing the nitrates. The resulting material is placed in a hydrogenation chamber, a hydrogen-containing fluid passed through the chamber, and the material is used as hydrogenating catalyst.

The hydrocarbon mixture just mentioned is introduced into the catalyst chamber 30 by means of pipe 10 and branch-pipe 12 (Figure 2), its rate of flow being maintained at about 100 gallons per hour, using approximately 6 cubic feet of catalyst. A light diluent, for example, butane, is introduced into this stream by means of pipe 18, manifold 20, pipe 21 and valve 24, with recycled butane from pipe 37 so that a total of 400 gallons per hour of diluent is admixed with the unsaturated hydrocarbon material that passes through distributor pipe 27. The temperatures of the several streams are suitably controlled so that the temperature of the mixed stream passing through distributor 27 has a temperature of 220° F. In this particular example, a total pressure of 750 pounds per square inch exists in catalyst chamber 30. Hydrogen is introduced into catalyst chamber 30 by means of pipes 42 and 31 at a rate of 1450 cubic feet per hour, this rate being controlled by means of valve 32.

Hydrogenation of the olefins then occurs in the catalytic mass below distributor 27 with evolution of heat. This heat will cause partial vaporization of the butane, along with a small portion of the motor-fuel boiling range stock, and a temperature rise will occur in the catalyst mass immediately below distributor 27 of 50–80° F. Upon condensation of the vapors by the means provided the heat is extracted and the hydrocarbons returned to the catalyst chamber 30.

While in this example all of the hydrocarbon material is introduced through distributor 27, all or part of it may be introduced through the other distributors shown and this method of operation is preferred when the zone of maximum temperature moves down the column with the eventual decreased activity of the topmost portion of catalyst. Similarly, the temperature of the stream entering the distributors may be adjusted to provide conditions required for maximum catalyst activity and life.

We do not wish to exclude from our invention certain modifications or variations that will be obvious to those skilled in the art. For example, various effluent streams may be placed in heat-exchange relationship with one or more ingoing streams to any desired degree or extent. Sufficient pumps have been shown to permit and facilitate the operation of the process under ordinary operation, but with certain particular modifications additional pumps or the like may be needed, and may be easily and obviously supplied by one skilled in the art. Additional cooling means, and details of absorbers and separators will likewise be obvious, and their inclusion or general arrangement will not alter the fundamentals of our invention. Hence, it is to be understood that, within the scope of the appended claims, the invention is as extensive in scope and equivalents as the prior art allows.

We claim:

1. The process of catalytic nondestructive hydrogenation of unsaturated organic material in the liquid phase, which comprises passing a liquid mixture comprising unsaturated organic material to be hydrogenated together with a portion of a more volatile miscible inert hydrocarbon liquid to the top portion of a substantially vertical catalytic hydrogenation zone containing a hydrogenation catalyst and wherein a downflowing liquid can pass countercurrently to an upflowing gas, passing a gas containing free hydrogen to the bottom portion of said reaction zone, maintaining in said zone reaction conditions such that the temperature is progressively higher from top to bottom and such that said unsaturated material is substantially completely hydrogenated in liquid phase and such that only a portion of said more volatile inert liquid vaporizes at the inlet to said zone and decreases in concentration in the liquid phase from the inlet to the outlet of said zone, passing to at least one intermediate point of said zone a liquid material comprising a further portion of said more volatile inert liquid to dilute said unsaturated organic material being hydrogenated and to inhibit a temperature rise caused by heat of reaction, passing gases and vapors from the top portion of said zone, and removing a substantially saturated liquid material so produced from the bottom portion of said zone.

2. An improved process for the nondestructive hydrogenation of unsaturated organic compounds in the liquid phase, which comprises passing a liquid mixture comprising an unsaturated organic material together with a more volatile miscible inert hydrocarbon liquid to the top portion of a substantially vertical catalytic hydrogenation zone containing a hydrogenation catalyst and wherein a downflowing liquid can pass countercurrently to an upflowing gas, passing a gas containing free hydrogen to the bottom portion of said hydrogenation zone, removing hydrogenated material from the bottom portion of said zone, maintaining in said zone reaction conditions such that the temperature is progressively higher from top to bottom and such that said unsaturated material is substantially completely hydrogenated in liquid phase and such that only a portion of said more volatile liquid vaporizes at the inlet to said zone and also such that said hydrogenated material effluent from said zone is in liquid phase and is relatively free of said more volatile liquid, the concentration of said low-boiling diluent in the liquid phase decreasing from top to bottom, passing gases and vapors from the top of said zone, recovering as a liquid vapors of said more volatile liquid from said gases and vapors, and returning liquid material so recovered to the top portion of said catalytic hydrogenation zone as at least a portion of said initial inert liquid diluent material.

3. An improved process for the nondestructive hydrogenation of unsaturated organic compounds in the liquid phase, which comprises passing a liquid mixture comprising an unsaturated organic material together with a more volatile miscible inert hydrocarbon liquid to the top portion of a substantially vertical catalytic hydrogenation zone containing a hydrogenation catalyst and wherein a downflowing liquid can pass countercurrently to an upflowing gas, passing a gas containing free hydrogen to the bottom portion of said hydrogenation zone, removing hydrogenated material from the bottom portion of said zone, maintaining in said zone reaction conditions such that the temperature is progressively higher from top to bottom and such that said unsaturated material is substantially completely hydrogenated in liquid phase and such that only a portion of said more volatile liquid vaporizes at the inlet to said zone and also such that said hydrogenated material effluent from said zone is in liquid phase and is relatively free of said more volatile liquid, said inert diluent being added in an amount sufficient to absorb as latent heat of vaporization a major portion of the exothermic heat evolved during the hydrogenation reaction and decreasing in concentration in liquid phase from top to bottom, passing gases and vapors from the top of said zone to an absorption zone, passing a portion of the liquid unsaturated material to be hydrogenated to said absorption zone as an absorption liquid to absorb vapors of said more volatile material, and passing a liquid effluent of said absorption zone to said hydrogenation zone as at least a portion of said liquid mixture charged.

4. In a process for the nondestructive hydrogenation of unsaturated organic compounds in the liquid phase, the improvement which comprises passing a liquid mixture comprising an unsaturated organic liquid material to be hydrogenated, together with an inert hydrocarbon diluent material boiling at least about 50° F. below the lowest boiling portion of said unsaturated material, to the top portion of a substantially vertical catalytic hydrogenation zone containing a hydrogenation catalyst and wherein a downflowing liquid can pass countercurrently to an upflowing gas, passing a gas containing free hydrogen to the bottom portion of said hydrogenation zone, maintaining in said zone nondestructive hydrogenation conditions such that the temperature is progressively higher from top to bottom and such that said unsaturated material is substantially completely hydrogenated in liquid phase with concomitant vaporization of said inert diluent material, increasing the average hydrogenation temperature as said hydrogenation catalyst decreases in activity to maintain a substantially constant amount of nondestructive hydrogenation, and employing at elevated hydrogenation temperatures a higher boiling inert diluent than is employed at lower hydrogenation temperatures, each said inert material being added in an amount such that its vaporization takes up substantially all the heat of reaction.

5. An improved process for the saturation of unsaturated material with free hydrogen, which comprises passing a liquid mixture, comprising an unsaturated organic material to which has been added at least 1 and not more than 6 times as much of a miscible inert diluent material boiling at least 50 and not more than 300° F. below the lowest boiling portion of said unsaturated material, to the top portion of a reaction zone in which there is present a hydrogenation catalyst, passing a hydrogen-containing gas to the bottom portion of said reaction zone, maintaining in said reaction zone a nondestructive hydrogenation temperature progressively higher from top to bottom and a hydrogenation pressure, said pressure being sufficient to maintain said organic material predominantly in liquid phase in said zone and also to maintain a concentration of said inert diluent in the liquid mixture at the temperature existing at the top of said reaction zone substantially the same as that in the mixture as introduced to said zone, the concentration of said low-boiling diluent in the liquid phase decreasing from top to bottom, removing from the bottom portion of said zone a liquid mixture containing saturated organic material and removing from the top portion of said zone a gaseous mixture comprising vapors of said inert diluent.

6. An improved process for the saturation of unsaturated hydrocarbons in the motor-fuel boiling range with free hydrogen, which comprises passing a liquid mixture, comprising unsaturated hydrocarbons in the motor-fuel boiling range having at least five carbon atoms per molecule in admixture with between 1 and 6 times as much butane, to the top portion of a vertical reaction zone in the presence of a hydrogenation catalyst, passing a free hydrogen-containing gas to the bottom portion of said reaction zone, maintaining in said reaction zone a nondestructive hydrogenation temperature progressively higher from top to bottom and a hydrogenation pressure, said pressure being sufficient to maintain hydrocarbons of at least five carbon atoms per molecule in liquid phase in said zone and also to maintain a concentration of butane in the liquid mixture at the top of said catalyst substantially the same as that in the mixture introduced to said zone, the concentration of said butane in the liquid phase decreasing from top to bottom, removing from the bottom portion of said zone a liquid hydrocarbon mixture comprising hydrocarbons in the motor-fuel range substantially saturated and substantially free of butane, and removing from the top portion of said zone a gaseous mixture of butane vapors and free hydrogen.

7. A continuous process for the nondestructive hydrogenation of normally liquid olefin polymers boiling within the gasoline range to produce the corresponding paraffins, which comprises passing a liquid hydrocarbon mixture comprising such olefins together with between one and six times as much butane to the top portion of a substantially vertical catalytic hydrogenation zone containing a hydrogenation catalyst and wherein a downflowing liquid can pass countercurrently to upflowing vapors, passing a gas containing free hydrogen to the bottom portion of said zone, maintaining in said zone nondestructive hydrogenation conditions such that said olefins are progressively hydrogenated to form the corresponding paraffins as liquid material flows from top to bottom of said zone with concomitant vaporization of said butane and concomitant decrease of butane concentration in the liquid phase, and such that the temperature is progressively higher from top to bottom, withdrawing butane vapors and unreacted gaseous hydrogen from the top of said zone, and withdrawing as a liquid from the bottom of said zone a substantially butane-free hydrocarbon material comprising essentially paraffin hydrocarbons boiling in the gasoline range so produced.

8. An improved process for the nondestructive hydrogenation of unsaturated organic compounds in the liquid phase, which comprises passing a liquid mixture comprising an unsaturated organic material to be hydrogenated to the top portion of a substantially vertical reaction zone containing a solid hydrogenation catalyst, said catalyst being so arranged as to permit downward flow of liquids and countercurrent upward flow of gases, admixing with said liquid mixture a second liquid mixture comprising saturated organic material produced by said hydrogenation and an inert diluent material boiling between about 75 and 150° F. below the lowest boiling portion of said unsaturated material, passing a free hydrogen-containing gas to the bottom portion of said zone, maintaining in said zone a nondestructive hydrogenation temperature progressively higher from top to bottom and a hydrogenation pressure such that only a portion of said inert diluent material vaporizes at the inlet to said zone and such that the hydrogenated effluent of said zone is in the liquid phase and is relatively free of said inert diluent, the concentration of said low-boiling diluent in the liquid phase decreasing from top to bottom, passing gases and vapors from the top of said zone to an absorption means, removing from the bottom of said zone liquid hydrogenated organic material and passing a portion of the hydrogenated effluent to said absorption means as an absorption liquid, and passing the liquid effluent of said absorption means to the hydrogenation zone.

9. The process of claim 8, wherein at least a portion of the free hydrogen effluent of said hydrogenation zone is freed of diluent vapors and returned as recycle hydrogen to the hydrogenation zone.

10. A process for the catalytic hydrogenation of an unsaturated hydrocarbon material boiling in the gasoline range, which comprises passing a stream of said material while in the liquid phase through a hydrogenation zone containing a hydrogenation catalyst at a hydrogenation temperature progressively higher in the direction of flow of said liquid and a hydrogenation pressure in countercurrent flow to a stream of hydrogen, incorporating in said stream of unsaturated material a substantially lower boiling hydrocarbon diluent, inert under the conditions prevailing in the zone, said catalyst being sufficiently active that the hydrogenation temperature can be maintained low enough to permit maintenance of the unsaturated material in the zone substantially in the liquid phase, said diluent being sufficiently volatile that substantial vaporization thereof takes place during the reaction under the conditions prevailing in the zone with a concomitant decrease in concentration of said diluent in the liquid phase in the direction of flow of said liquid, and said diluent being added in sufficient quantity to absorb as latent heat of vaporization a major portion of the exothermic heat evolved during the hydrogenation reaction.

11. In a process for the catalytic, nondestructive hydrogenation of unsaturated organic materials in which such organic material is passed through a hydrogenation zone in countercurrent flow to a stream of free hydrogen under a hydrogenation temperature in the presence of a hydrogenation catalyst and at a pressure sufficient to maintain a major portion of such organic material in the liquid phase, the method for controlling temperature rise due to the exothermic heat evolved as the hydrogenation reaction proceeds during passage of such organic material through said zone which comprises diluting the organic material with a sufficient quantity of a substantially more volatile hydrocarbon diluent in the liquid state, inert under the conditions prevailing in the chamber, to absorb a major portion of the exothermic heat liberated by the reaction, the aforesaid pressure being so regulated that vaporization of inert diluent at the temperature prevailing at the point of introduction to the chamber is not substantial but becomes substantial as the material in liquid phase flows through said zone and the reaction proceeds and the temperature rises, the concentration of said diluent in the liquid phase decreasing in the direction of flow of said liquid.

HAROLD J. HEPP.
JEAN P. JONES.

CERTIFICATE OF CORRECTION.

Patent No. 2,332,572.                  October 26, 1943.

HAROLD J. HEPP, ET AL.

It is hereby certified that error appears in the printed specification of the above numbered patent requiring correction as follows: Page 3, second column, line 55, for "an" read --as--; line 60, for "In" read --An--; and that the said Letters Patent should be read with this correction therein that the same may conform to the record of the case in the Patent Office.

Signed and sealed this 4th day of January, A. D. 1944.

(Seal)

Henry Van Arsdale,
Acting Commissioner of Patents.